United States Patent

Arulpragasam

[15] 3,639,904

[45] Feb. 1, 1972

[54] DATA COMMUNICATION SYSTEM OF LOOP CONFIGURATION AND SERIAL TRANSMISSION OF TIME SLOTS

[72] Inventor: Jeganandaraj A. Arulpragasam, Westhill, Ontario, Canada

[73] Assignee: International Business Machines Corporation, Armonk, N.Y.

[22] Filed: May 5, 1970

[21] Appl. No.: 34,778

[30] Foreign Application Priority Data

Nov. 10, 1969 Canada ..................................067,036

[52] U.S. Cl. ..................340/147 R, 179/15 AT, 179/15 AL, 340/147 LP

[51] Int. Cl. ..........................................................H04q 9/00

[58] Field of Search.................340/147, 147 LP; 179/15 AT, 179/15 AL; 178/50

[56] References Cited

UNITED STATES PATENTS

| | | | |
|---|---|---|---|
| 3,323,119 | 5/1967 | Barcomb et al. | 340/147 X |
| 3,350,697 | 10/1967 | Hirvela | 340/147 X |
| 3,456,242 | 7/1969 | Lubkin et al. | 179/15 AL |
| 3,483,329 | 12/1969 | Hunkins et al. | 340/147 X |
| 3,485,953 | 12/1969 | Norberg | 340/147 X |
| 3,529,089 | 9/1970 | Davis et al. | 179/15 AL |
| 3,544,976 | 12/1970 | Collins | 179/15 AL |

*Primary Examiner*—Donald J. Yusko
*Attorney*—Hanifin and Jancin and John B. Frisone

[57] ABSTRACT

In a data communication system a plurality of remote stations and a central station are arranged in a series loop. The central station transmits a succession of time slots to the loop and information is transferred between the central station and the remote stations with character interleaving under control of the central station. Each remote station includes one or more terminals. A terminal wishing to transmit a message sends a request-for-service signal to the central station in the first free time slot received by its remote station. The terminal cannot transmit a message or a further request-for-service signal until it receives a proceed signal from the central station. After receiving a proceed signal the terminal can transmit a message. At the end of the message the terminal is again locked out (i.e. it cannot transmit message data) but remains free to transmit a request-for-service signal by which means it may again obtain a line position.

18 Claims, 4 Drawing Figures

DATA COMMUNICATION SYSTEM OF LOOP CONFIGURATION AND SERIAL TRANSMISSION OF TIME SLOTS

The present invention relates to data communication systems.

The communication system of the invention has particular application in a data processing system wherein a powerful central computer services a large number of low-speed input-output terminals. In such a system the terminals are grouped in a plurality of complexes each of which includes a central station or concentrator which gathers messages from the terminals in the complex and passes them on to the computer as well as distributing messages from the computer to the individual terminals. Data processing systems of this type are known in the art, one specific example of such system being described in U.S. Pat. application, Ser. No. 791,334, filed Jan. 15, 1969 and assigned to International Business Machines Corporation.

It is a general object of the invention to provide an improved data communication system including a plurality of terminals and a central station arranged in a series loop.

It is a more specific object of the invention to provide an improved data communication system as aforesaid wherein transfer of information between the terminals and the central station is controlled with enhanced efficiency by the central station.

The foregoing and other objects are achieved in accordance with the invention by the provision of a central station and a plurality of remote stations each of which includes at least one terminal. While it is contemplated that all the terminals will be input or input-output devices, the invention also embraces the situation where some of the terminals have output capability only. The remote stations and the central station are interconnected in a series loop by transmission means and the central station accepts messages from the terminals on the loop with character interleaving between terminals. The central station also can send out character interleaved messages to the terminals. The central station transmits serially to the first remote station on the loop a plurality of time slots which may be free or busy. Each remote station examines each time slot and transmits it with its contents altered or unaltered to the next device on the series loop, which may be another remote station, or, in the case of the last remote station, the central station. Each terminal with input capability has request means, such as a request key, by which it may enter a request-for-service signal in a free time slot when the latter is received at the terminal's associated remote station. Each input terminal also has associated with it lockout means operative to prevent input of data to the system via the terminal after its request means has been actuated and before there is received by its associated remote station a slot bearing a proceed signal addressed to the terminal by the central station in response to the request-for-service signal. The lockout means is disabled upon receipt of the proceed signal by the associated remote station.

Other objects, advantages and features of the invention will become apparent from the following description of a preferred embodiment thereof which is illustrated in the accompanying drawings, wherein.

Figure 1:
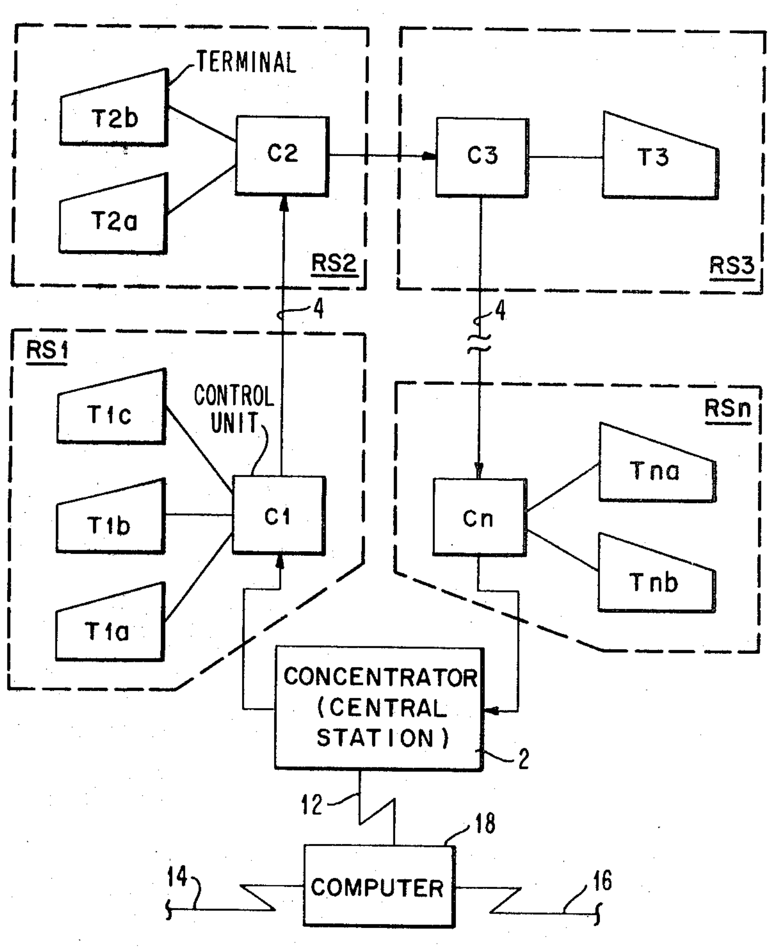
FIG. 1 is a schematic diagram showing the general arrangement of a data communication system in accordance with the invention.

As shown in FIG. 1 a data communication system in accordance with the invention comprises a central station or concentrator 2 and a plurality of remote stations RS1 to RS*n*. Each of the remote stations includes at least one terminal generally designated by the letter T. Thus remote station RS3 may have a single terminal T3, whereas remote station RS1 may have three terminals T1*a*, T1*b* and T1*c* and remote stations RS2 and RS*n* both may have two terminals. Transmission means 4 interconnect the remote and central stations in a series loop as shown.

Concentrator 2, which may be for example an IBM (registered trade mark) system/360 model 25 computer, includes means for transmitting serially to remote station RS1, which is the first remote station on the series loop, a plurality of time slots. Any of the various devices known in the time division multiplexing art for generating time slots may be used for this purpose. One preferred structure for the time slots will be described in more detail hereinafter; suffice it to say, for the present, that each time slot may be in either a free state, in which it is available to receive data from a remote station, or a busy state in which it is not so available.

Each of the remote stations RS1 to RS*n* has means for receiving and examining the time slots as they are transmitted to it over the loop, for selectively altering the content of the slots and for retransmitting the slots to the next device in the series loop, which may be the next remote station or, in the case of remote station RS*n*, the concentrator 2. Preferably the receiving, examining, retransmitting and altering means are physically located in a control unit such as C1, C2, C3 and C*n* with which each remote station is provided.

Figure 2:
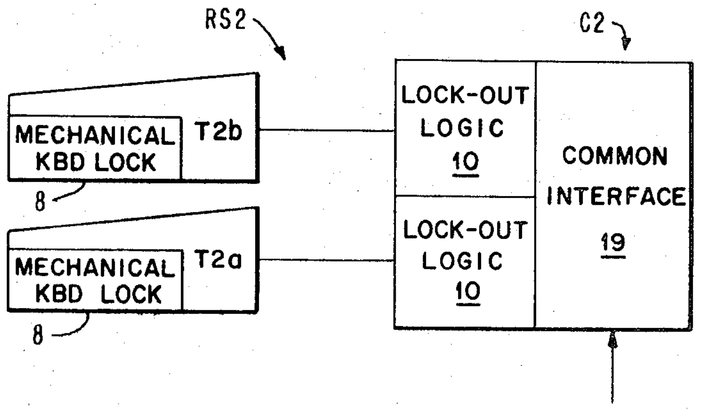
FIG. 2 is a portion of FIG. 1 on an enlarged scale.

In the present embodiment each of the terminals T1*a* to T*n*B is an input-output typewriter, such as the IBM 2980 model 2 terminal unit, and all terminals in a remote station are connected in parallel to the control unit at that station. For example remote station RS2 comprises a control unit C2 and terminals T2*a* and T2*b* connected in parallel thereto as shown in FIGS. 1 and 2.

Each of the terminals T1*a* to T*nb* can input data to the system via the control unit at its remote station and can also print out data supplied to it by the concentrator 2. However it is also within the scope of the invention that some of the terminals may have output capability only.

Each of the terminals T1*a* to T*nb* includes request means such as a request key 6 (illustrated schematically in FIG. 3) actuable to enter a request-for-service signal in a free time slot received at the terminal's associated remote station after the request means has been actuated. Preferably the request-for-service signal is entered in the first free time slot received by the remote station after actuation of the request key 6.

Each of the terminals T1*a* to T*nb* also has associated therewith lockout means, such as a mechanical keyboard lock 8 and lockout logic 10. As described in greater detail hereinafter, the lockout means prevents input of data to the system via the terminal after request key 6 has been actuated and before there is received by the terminals's associated remote station a time slot bearing a proceed signal addressed to the terminal by the concentrator 2 in response to the request-for-service signal initiated by the request key 6. The lockout means is disabled when the remote station receives the proceed signal, so that the terminal is then free to input data to the system.

It is contemplated that the series loop data communication system thus far described will be incorporated in a large scale data processing system including a very large number of terminals grouped in a number of series loops similar to the one described herein. The concentrators of the several loops would be coupled by high-speed data transmission lines such as 12, 14 and 16 to a central computer 18 wherein processing of the data is effected. A single concentrator such as the concentrator 2 may service a plurality of loops. However for present purposes it is sufficient to describe one such loop and its operation since all other loops in the data processing system would function in a similar fashion.

The loop presents a transmit end and a receive end to the concentrator 2 and the flow of time slots from the transmit end to the receive end is indicated by the arrowheads in FIG. 1. For every slot transmitted on the loop by the concentrator 2 an entry is made in a table (the "loop image table") within the concentrator. After travelling round the loop a slot will arrive at the receive end thereof, at which time the received slot is compared with the slot sent out by reference to the loop image table. If a slot was transmitted in a free state and received back in a busy state a character must have been inserted in the slot by one of the terminals T1*a*–T*nb*. If the slot contains a request character the concentrator 2 tests a line counter and sends a proceed character to the terminal originating the request character if a line position is available for that terminal. Any data characters reaching the concentrator 2 via the receive end of the loop will be stored by it in a message buffer. At completion of a keyed message the latter will be enqueued for transmission over the high-speed transmission line 12 to the central computer 18.

Although in FIG. 1 only eight terminals have been shown on the loop, a single loop may include many more e.g., up to 64, terminals, some of which may have higher priority than others. As an example, flow of data round the loop may be at the rate of 2,400 bits per second and each time slot may comprise 16 bits as shown schematically in FIG. 4. In given circumstances efficient operation may be achieved by having only a limited number of terminals, say 11, occupying the loop simultaneously, and of these only a smaller number, say five, may be functioning in an output capacity (i.e., printing out a message forwarded by the concentrator 2).

The concentrator 2 controls access of the terminals to line positions in a manner to be described, and the terminals are not permitted to transmit messages on the line until they are given such positions. The concentrator 2 assigns line positions according to any predetermined priority by terminal type and also according to the nature of the transactions (e.g., input or output). The concentrator 2 may also vary the number of line positions assignable to the different types of terminals, adaptively if necessary. Since the terminals T1*a* to T*nb* are preferably unbuffered and operate asynchronously there is a possibility that data input to the system from a given terminal may be lost owing to the terminal's being unable to find a free slot or slots on the loop in which to put the data in time. This phenomenon is known as "overrun." The concentrator 2 can reduce the probability of overrun by the terminals on the loop to a value less than any predetermined criterion by limiting the number of terminals occupying the line at any one time.

To achieve these ends the concentrator 2 is able to make any necessary "tradeoff" between the parameters of response time (time required to transmit a message received by the concentrator from the computer 18 to a terminal), access time (time from a terminal's sending a request character to its receiving a proceed character), overrun probability and message buffering in its own storage area.

By these means the invention achieves relatively high utilization of the line by a plurality of terminals operating asynchronously at speeds which vary within wide limits.

Figure 4:
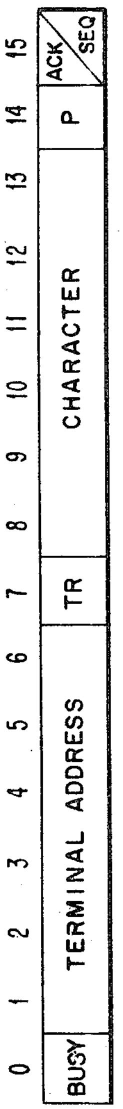
FIG. 4 is a diagrammatic representation of a time slot employed in the system of the invention.

For a better understanding of the invention the structure of a time slot will now be briefly described with reference to FIG. 4. As noted above each slot preferably contains 16 bits. In FIG. 4 the bits are numbered from zero to 15. Within the slot the bits may have the following functions:

| | |
|---|---|
| Bit No. 0– | -indicates the state of the slot. When this bit is a "1" the slot is busy i.e., carrying information. When this bit is "0" the slot is free and available for use by a terminal. |
| Bits Nos. 1-6– | this field contains the address of a terminal to which or from which any information in the slot was provided. |
| Bit No. 7– | this is the transmit bit and is a "1" when the information in the slot originated at the concentrator. When a terminal picks up a slot this bit will be made a "0." |
| Bits Nos. 8-13– | this field contains a character in six-bit code whenever bit No. 0 is a "1." |
| Bit No. 14– | this is the parity bit which will make odd parity over all 16 bits of the slot whether the latter is free or busy. |
| Bit No. 15– | if bit No. 7 is a "1," this is an acknowledgement bit. It is usually a "0" but is made into a "1" by the addressed terminal when the slot has been received with good parity and the status of the terminal allows it to handle the character. If bit No. 7 is a "0," this is a sequence control bit and is alternately a "1" and a "0" in a successive characters from the same terminal. |

In operation the concentrator 2 transmits a succession of such slots, which are usually free, to the transmit end of the loop. If the concentrator wishes to pass a control character or a message character (for printing) to a particular terminal, it will take up a slot in which it will set bits Nos. 0 and 7 to a "1" and bit No. 15 to a "0." Bits Nos. 1–6 will carry the address of that terminal and bits Nos. 8–13 will carry the appropriate character. Bit No. 14 will have the sense that will make the number of "1's " in the whole 16 bits of the slot an odd number.

The control unit (C1, C2 etc.) at each remote station (RS1, RS2 etc.) examines each slot which it receives via the transmission means 4 and, if bit No. 0 is a "1," compares the address as it appears in bits Nos. 1–6 with wired-in addresses respectively corresponding to the terminals at that remote station. If they match and bit No. 7 is a "1" the control unit will pick up the character appearing in bits Nos. 8–13. If the control unit detects that this is a control character which it can accept or if it is addressed to a terminal that is printing and is a valid character (i.e., the parity is good and bit No. 15 is a "0" ), it will proceed to invert bits Nos. 14 and 15. The control unit will then use the character thus received, e.g., by transmitting it to a terminal to be printed out. When the slot returns to the concentrator 2 via the receive end of the loop the concentrator recognizes a valid acknowledgement only if bit No. 15 is a "1" and the parity is good. If the address in the slot does not match the address of any terminal at that remote station the control unit transmits the slot unchanged to the next device on the loop which may be another remote station or the concentrator 2.

When a control unit wishes to forward a character to the concentrator for a request, as a status indication, or as a data character, it will seize the next slot it receives which is free i.e., wherein bit No. 0 is a "0." It does so by carrying out a "test and set" type of operation in bit No. 0 of each slot. If the slot already has a "1" in bit No. 0 the insertion of a "1" by the control unit will be ineffective. If however bit No. 0 is found to be a "0" on entering the control unit the slot is thus marked as busy by the insertion of a "1" in this bit. The appropriate terminal address is then put in bits Nos. 1–6, bit 7 is set to a "0," the character is inserted in bits Nos. 8–13, bit No. 14 is the parity bit and bit No. 15 is set to a "0" under sequence control.

The foregoing functions of the control unit are performed by devices which are well known in the art and which need not be described herein. Preferably such devices are shared by the several terminals served by a particular control unit and for convenience will herein be collectively termed the common interface portion 19 of the control unit (see FIG. 2), that is to say the devices in question form a common interface between the terminals served by that control unit and the line constituted by the series loop. In addition to the common interface 19 each control unit preferably embodies the lockout logic 10 associated with each of its terminals. As shown in FIG. 2 separate lockout logic 10 is provided for each terminal.

Figure 3:
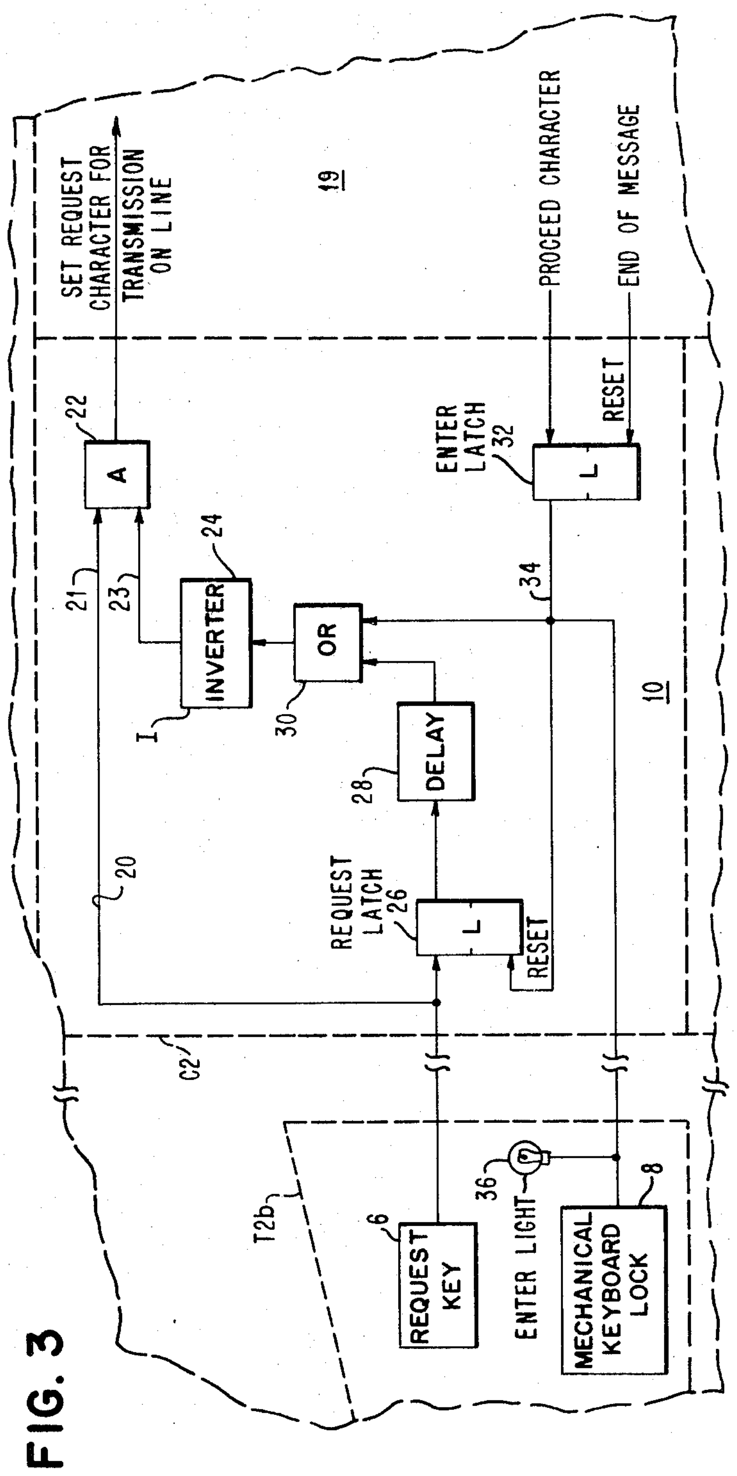
FIG. 3 is a diagram illustrating the lockout means of the invention.

The procedure whereby a terminal obtains service will now be described in detail with reference to terminal T2*b* and its associated control unit C2 shown in FIG. 3.

A terminal operator wishing to send a message presses the request key 6 on terminal T2*b*. Depression of the request key 6 causes a signal to travel along conductor 20 to one input 21 of an AND-gate 22 which forms part of the lockout logic 10 for terminal T2*b* in control unit C2. A second input 23 of AND-gate 22 is normally provided with a signal of the same polarity by an inverter 24, so that AND-gate 22 yields an output which is fed to an encoding device (not shown) in the common interface portion 19 of control unit C2. The encoding device sets a request character for transmission to the concentrator 2 in the first free time slot received by the control unit after the key 6 has been pressed. The request character is forwarded to the concentrator in exactly the same way as is a message character in the case of a terminal which has already been assigned a line position; that is the control unit C2 seizes the next available free slot, changes it to busy and inserts the request character and the address of the terminal in the appropriate fields.

Depression of the key 6 also activates an electronic request latch 26 whose output is fed via a delay 28 and an OR-circuit 30 to inverter 24, causing the polarity of the signal at input 23 of AND-gate 22 to be reversed. However, because of delay 28 this change of polarity takes place only after the AND-gate 22 has provided an output in response to depression of the key. If the operator of terminal T2*b* presses the key 6 again before a proceed signal is received no further load will be imposed on the line since the polarities at the inputs 21 and 23 of AND-gate 22 will be different. Input of data to the line is prevented by the mechanical keyboard lock 8 which normally keeps the keys of the keyboard other than the request key mechanically locked against operation.

The terminal T2*b* does not have a line position assigned at the time the request-character is forwarded—indeed this constitutes an attempt to get one. Upon receipt of the request character the concentrator 2 examines a line counter. If this indicates that there are line positions available on the loop, the concentrator 2 increments the line counter and transmits a proceed character addressed to the terminal T2*b*. But if the line counter indicates that no line positions are free the terminal address is entered into a queue at the appropriate priority for that terminal type and for the requested transaction, which is input in the present case. The queues are serviced by the concentrator 2 in order of priority whenever a line position is released.

When a proceed character is received by the control unit C2 the common interface portion 19 of the latter provides a signal which activates an electronic enter latch 32 (forming part of lockout logic 10) whose output on conductor 34 renders inoperative the mechanical keyboard lock 8 and preferably also provides a visible or audible indication (such as turning on "enter" light 36) that the terminal T2*b* is on line. The output of enter latch 32 is also operative to reset request latch 26 and to reverse the polarity of the signal at input 23 of AND-gate 22 via OR-circuit 30 and inverter 24. The operator can now use the keyboard of terminal T2*b* to key a message which is transmitted to concentrator 2 by transmission means 4.

When the operator finishes keying the message an end of message signal—which may for example be an acknowledgement character from concentrator 2—resets enter latch 32 whereby the mechanical keyboard lock 8 is again rendered operative and the enter light 36 is turned off. The terminal T2*b* is now off line and for input purposes can be put on line again only by a proceed character addressed thereto by concentrator 2 in response to a further request character which the operator sends by pressing request key 6.

It will be seen from the foregoing description that the concentrator 2 completely controls access of the terminals to the line and is able to ensure optimum utilization of the line by a plurality of terminals as well as servicing of terminals in accordance with a predetermined scheme of priorities.

While the invention has been particularly shown and described with reference to a preferred embodiment thereof, it will be understood by those skilled in the art that various changes in form and details may be made therein without departing from the spirit and scope of the invention.

What is claimed is:

1. A data communication system comprising:

a central station;

a plurality of remote stations, each remote station including at least one terminal, some at least of said terminals serving as input terminals for the system;

transmission means interconnecting said remote stations and said central station in a series loop;

means at said central station for transmitting serially to a first remote station in the loop a plurality of time slots each being in either a free state, in which it is available to receive data from a remote station, or a busy state in which it is not so available;

means at each of the remote stations for receiving and examining said slots, for selectively altering the content of said slots and for transmitting said slots to the next device in the series loop which may be another of said remote stations or the central station;

request means at each of said input terminals actuable to enter a request-for-service signal in a free time slot received by the input terminal's associated remote station after actuation of the request means, and lockout means associated with each of the input terminals operative to prevent input of data to the system via said terminal after its request means have been actuated and before there is received by its associated remote station a slot bearing a proceed signal addressed to said terminal by the central station in response to said request-for-service signal;

the lockout means being disabled upon receipt of said proceed signal by said associated remote station.

2. A system as claimed in claim 1 wherein:

each request means is operative to enter the request-for-service signal in the first free time slot received by its associated remote station after actuation of said request means.

3. A system as claimed in claim 2 wherein:

each of said input terminals includes a keyboard and which is actuable to input data to the system, and said lockout means includes means for preventing actuation of said keyboard.

4. A system as claimed in claim 1 wherein:

each of said input terminals includes a keyboard which is actuable to input data to the system, and said lockout means includes an electronic latch (herein called an enter latch) activatable by said proceed signal, and means for preventing actuation of said keyboard;

said means for preventing actuation of the keyboard being normally operative but being rendered inoperative when the enter latch is activated by the proceed signal.

5. A system as claimed in claim 4 wherein:

the enter latch is resettable by an end-of-message signal indicating that input of data from said input terminal has been completed, at least temporarily, said means for preventing actuation of the keyboard being rendered operative again upon resetting of the enter latch as aforesaid.

6. A system as claimed in claim 1 wherein:

each of said input terminals includes a keyboard which is actuable to input data to the system, said request means comprises a request key on said keyboard which is operative to initiate said request-for-service signal, and said lockout means is also operative to prevent input of a further request-for-service signal to the system before said proceed signal is received as aforesaid.

7. A system as claimed in claim 6 wherein said lockout means includes an electronic latch (herein called a request latch) which is activated by said request key and reset when said proceed signal is received at said remote station.

8. A system as claimed in claim 6 wherein:

said lockout means includes means for preventing actuation of all keys on said keyboard except said request key.

9. A system as claimed in claim 8 wherein;

said lockout means includes an electronic latch (herein called an enter latch) settable by said proceed signal, said means for preventing actuation being normally operative but being rendered inoperative when the enter latch is activated by the proceed signal.

10. A system as claimed in claim 9 wherein:

said lockout means includes an electronic latch (herein called a request latch) which is activated by said request key and reset when said proceed signal is received at said remote station.

11. A system as claimed in claim 10 wherein:

said enter latch is resettable by an end-of-message signal indicating that input of data from said input terminal has been completed at least temporarily, said means for preventing being rendered operative again upon resetting of the enter latch as aforesaid.

12. A system as claimed in claim 1 wherein:

each of said remote stations includes at least one terminal and a control unit to which all the terminals at said remote station are connected in parallel;

said control unit including a common interface with said transmission means which interface is shared by all terminals at said remote station, and being interconnected with the control units of the other remote stations by said transmission means in said series loop.

13. A system as claimed in claim 12 wherein each terminal at each remote station is an input terminal and includes a keyboard actuable to input data to the system, and said lockout means includes both mechanical and electronic elements.

14. A system as claimed in claim 13 wherein:

said lockout means includes mechanical means at said terminal for preventing actuation of said keyboard and an electronic latch (herein called an enter latch) forming part of said control unit and activatable by said proceed signal;

said mechanical means for preventing actuation being normally operative but being rendered inoperative when the enter latch is activated by the proceed signal.

15. A system as claimed in claim 14 wherein:

the enter latch is resettable by an end-of-message signal indicating that input of data from said input terminal has been completed, at least temporarily, said mechanical means for preventing actuation of the keyboard being rendered operative again upon resetting of the enter latch as aforesaid.

16. A system as claimed in claim 13 wherein:

said request means comprises a request key on said keyboard which is operative to initiate said request-for-service signal, and said lockout means is also operative to prevent input of a further request-for-service signal to the system before said proceed signal is received as aforesaid and includes mechanical means at said input terminal for preventing actuation of all keys on said keyboard except said request key, an electronic latch (herein called an enter latch) forming part of said control unit and activatable by said proceed signal, and another electronic latch (herein called a request latch) also forming part of said control unit;

said request latch being activated by said request key and being reset when the proceed signal is received at said remote station;

said mechanical means for preventing actuation being normally operative but being rendered inoperative when the enter latch is activated by the proceed signal;

said enter latch being resettable by an end-of-message signal indicating that input of data from said input terminal has been completed, at least temporarily;

said mechanical means for preventing actuation being rendered operative again upon resetting of the enter latch as aforesaid.

17. A system as claimed in claim 1 wherein the total number of terminals on said loop exceeds the number of terminals which can be assigned line positions for transmitting or receiving data at any one time, said system further comprising:

queuing means at said central station operative to queue any terminal from which the central station has received a request-for-service signal until a line position becomes available for that terminal and the central station transmits a proceed signal to it.

18. A system as claimed in claim 17 wherein:

said queuing means is operative to queue said terminals in accordance with a predetermined priority scheme.

* * * * *